US011314631B2

(12) United States Patent
Kaakai et al.

(10) Patent No.: US 11,314,631 B2
(45) Date of Patent: Apr. 26, 2022

(54) METHOD FOR AUTOMATICALLY VALIDATING COTS AND DEVICE FOR IMPLEMENTING THE METHOD

(71) Applicant: THALES, Courbevoie (FR)

(72) Inventors: Fateh Kaakai, Rungis (FR); Béatrice Pesquet, Rungis (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/906,817

(22) Filed: Jun. 19, 2020

(65) Prior Publication Data
US 2020/0401507 A1    Dec. 24, 2020

(30) Foreign Application Priority Data

Jun. 20, 2019 (FR) .................................. FR1906638

(51) Int. Cl.
*G06F 11/36* (2006.01)
*G06N 20/00* (2019.01)
*G06N 5/04* (2006.01)

(52) U.S. Cl.
CPC ...... *G06F 11/3692* (2013.01); *G06F 11/3688* (2013.01); *G06N 5/04* (2013.01); *G06N 20/00* (2019.01)

(58) Field of Classification Search
CPC ............................ G06F 11/3692; G06N 20/00
USPC .................................................. 717/124–167
See application file for complete search history.

(56) References Cited

U.S. PATENT DOCUMENTS

| 6,862,696 B1* | 3/2005 | Voas | G06F 11/3466 714/38.11 |
| 10,691,526 B2* | 6/2020 | Barowy | G06F 11/079 |
| 2006/0075236 A1* | 4/2006 | Marek | H04L 9/0894 713/171 |
| 2012/0151270 A1* | 6/2012 | Stolfo | G06F 11/079 714/38.1 |

(Continued)

OTHER PUBLICATIONS

Hu, Gang, Linjie Zhu, and Junfeng Yang. "AppFlow: using machine learning to synthesize robust, reusable UI tests." Proceedings of the 2018 26th ACM Joint Meeting on European Software Engineering Conference and Symposium on the Foundations of Software Engineering. 2018.pp.269-282 (Year: 2018).*

(Continued)

*Primary Examiner* — Satish Rampuria
(74) *Attorney, Agent, or Firm* — BakerHostetler (57) ABSTRACT

A method for testing a software component implemented in a host system on the basis of one or more test campaigns, a test campaign includes computer test cases and being associated with input test data. The method comprises the steps of: executing the computer test cases of each test campaign for an operating time of the software component, which provides output test data associated with each test campaign; determining a reference operating model and a data partition on the basis of the input and output test data associated with each test campaign; running the software component using input production run data, which provides output production run data; determining an operating characteristic of the software component on the basis of the reference operating models according to a comparison between the input and output production run data and the data from the data partitions associated with the one or more test campaigns.

10 Claims, 4 Drawing Sheets

(56) References Cited

U.S. PATENT DOCUMENTS

2016/0239401 A1* 8/2016 Li .................. G06F 11/3608
2020/0183482 A1* 6/2020 Sebot ................ G06F 1/3228

OTHER PUBLICATIONS

Siddiqui, Atif, Muhammad Yousuf Irfan Zia, and Pablo Otero. "A Universal Machine-Learning-Based Automated Testing System for Consumer Electronic Products." Electronics 10.2 (2021): pp. 1-26. (Year: 2021).*
Toyao, Takashi, et al. "Machine learning for catalysis informatics: Recent applications and prospects." Acs Catalysis 10.3 (2019): pp. 2260-2297. (Year: 2019).*
Hoare, Tony. "The verifying compiler: Agrand challenge for computing research." International Conference on Compiler Construction. Springer, Berlin, Heidelberg, 2003.pp.262-272 (Year: 2003).*
Soeken, Mathias, et al. "Verifying UML/OCL models using Boolean satisfiability." 2010 Design, Automation & Test in Europe Conference & Exhibition (Date 2010). IEEE, 2010.pp.1-4 (Year: 2010).*
Thüm, Thomas, et al. "Family-based deductive verification of software product lines." Proceedings of the 11th International Conference on Generative Programming and Component Engineering. 2012.pp. 11-20 (Year: 2012).*
Nguyen, "The application of machine learning methods in software verification and validation", pp. 1-37, Aug. 31, 2010.
Pandey, "Machine learning in formal verification FMCAD 2016 Tutorial", Jan. 1, 2016.

* cited by examiner

METHOD FOR AUTOMATICALLY VALIDATING COTS AND DEVICE FOR IMPLEMENTING THE METHOD

CROSS-REFERENCE TO RELATED APPLICATIONS

This application claims priority to foreign French patent application No. FR 1906638, filed on Jun. 20, 2019, the disclosure of which is incorporated by reference in its entirety.

FIELD OF THE INVENTION

The general field of the invention is that of information systems. It relates more particularly to the validation of components, equipment, products, information systems and software applications using free software or off-the-shelf software products.

BACKGROUND

A commercial off-the-shelf (COTS) computer product (software or hardware) refers to any computer product mass-produced and mass-distributed to meet specific needs of a plurality of users who may use it in a standalone manner. Commercial off-the-shelf computer products are increasingly used in industrial systems by virtue of their low design, production and maintenance costs.

Commercial off-the-shelf software is software designed by the contractor or a third-party publisher, existing in multiple copies, the source code of which may be available, sold, leased, provided for free by a vendor (for example free software), or unknown. Commercial off-the-shelf software is intended to be incorporated as extra parts in host systems such as information systems and software applications. Examples of commercial off-the-shelf software comprise extension components (for example plug-ins, codecs, drivers, etc.), libraries, executable files, files, data components (for example databases and ontologies), and configuration elements such as settings, scripts, and command files.

The integration of commercial off-the-shelf software makes it possible to use software that is new and upgradable at low cost, operational in a short time, and reusable in other specific systems.

In computer science, a validation test refers to a computer test which makes it possible to verify whether a software item meets all of the customer's requirements described in the specifications document for the software. The main objective of a validation test is to look for information regarding the quality of the system and to identify a number of problematic behaviours of the tested software for decision-making purposes.

Validation tests take place over a plurality of phases, with functional validation, solution validation, and performance and robustness validation. Functional tests ensure that the various modules or components correctly implement the customer's requirements. Solution validation tests ensure that the customers requirements are met from a "use case" point of view. Performance tests verify the conformity of the solution with respect to performance requirements, and robustness tests make it possible to identify potential problems with stability and reliability over time.

The classification of computer tests may be based on the nature of the object to be tested, or on the accessibility of the structure of the object, or else on the ownership of the object. According to the nature of the tested object, there are four test levels: component tests (or unit tests), integration tests, system tests and acceptance tests. According to the accessibility of the structure of the object, there are three validation test techniques: "white box" testing, "grey box" testing and "black box" testing.

White box tests, which are generally functional tests, make it possible to verify the internal structure of a component or of a system. The tested object meets a stated need. Its interfaces are specified and its content becomes the property of the integrator of the object into the host system. The tested object becomes an integral part of the host system with the possibility of adapting its validation strategies, transferring some of the know-how from the developer (or provider) to the integrator, and adapting the object to the needs of the specific system. For some types of software, techniques for designing white box tests are prescribed by standards (for example the standards RTCA/DO-178C/DO-278C or EUCOCAE ED-12C/ED-109A for the aerospace industry).

Grey box tests make it possible to test an object which meets a stated need, the interfaces of which are specified and the content of which is partially known. Some of the development data becomes the property of the host system integrator with visibility of the source code and of certain technical documents (specifications) and tests from the provider.

Black box tests, whether functional or non-functional, make it possible to verify the definition of the tested object by verifying that the outputs obtained are indeed those expected for given inputs, the tested object having specified interfaces but unknown content.

The validation of commercial off-the-shelf software and of free software is often based on black box testing techniques due to the black box effect which characterizes this software due to the lack or obsolescence of its specification, architecture and design documents, and formalized proof of testing. The strategies for validating commercial off-the-shelf software and free software also depend on managing the interactions between the integrated software and the host system and are affected by the application domain, faults in the hardware and software elements of the host system, the validation of the host system, and the evolution of the tested software.

The techniques for validating and qualifying commercial off-the-shelf software and free software depend on the integrator (owner of the host system) having access to the specifications for this software. In the case that the specification exists and is sufficiently accurate, the integrator tests and validates the software in its context of use by running one or more previously developed tests to verify that said software meets one or more specific requirements and sends the defects observed to the publisher of the tested software. In the case that the specification is unknown or highly incomplete or obsolete, the software must be validated in black box mode, which may run contrary to certain certification requirements which stipulate that the internal design of the tested software component must be verified.

SUMMARY OF THE INVENTION

To this end, the subject of the invention is a method for testing and automatically validating commercial off-the-shelf software and free software allowing the operation of a commercial off-the-shelf software item or a free software item to be tested, validated, verified and qualified automatically. More specifically, the invention provides a method for testing a software component implemented in a host system on the basis of one or more test campaigns, a test campaign comprising computer test cases and being associated with input test data. The method is characterized in that it comprises the steps of:

executing the computer test cases of each test campaign for an operating time of the software component, which provides output test data associated with each test campaign;

determining a reference operating model and a data partition on the basis of the input and output test data associated with each test campaign, a reference operating model being determined by applying a machine learning algorithm to the input and output test data, a data partition being determined by applying a data partitioning algorithm to the input and output test data;

running the software component using input production run data, which provides output production run data;

determining an operating characteristic of the software component on the basis of the reference operating models according to a comparison between the input and output production run data and the data from the data partitions associated with the one or more test campaigns.

According to some embodiments, the machine learning algorithm may be a machine learning algorithm chosen from a group comprising unsupervised clustering machine learning algorithms.

According to some embodiments, the machine learning algorithm may be a deep neural network.

According to some embodiments, the data partitioning algorithm may be chosen from a group comprising, without limitation, the k-means algorithm, hierarchical clustering algorithms and expectation-maximization algorithms.

According to some embodiments, the set of data partitions associated with the one or more test campaigns may correspond to a domain of use of said software component, the input production run data and the output production run data being represented by an operating point of said software component. The step of determining an operating characteristic of the software component may, according to these embodiments, comprise the operation of determining whether said operating point belongs to the domain of use and to a data partition.

According to some embodiments, the domain of use may comprise at least one failure region, the operating characteristic being able to be an operating anomaly of the software component if the operating point is within the at least one failure region or if the operating point does not belong to the domain of use of the software component.

According to some embodiments, the operating characteristic may be a new functionality of the software component if the operating point belongs to the domain of use and does not belong to any of the one or more data partitions or to any of the at least one failure regions.

According to some embodiments, each data partition and each operating model associated with each test campaign may correspond to a given functionality of the software component, the operating characteristic being the given functionality if the operating point belongs to the data partition corresponding to the given functionality.

According to some embodiments, the computer test cases may be defined according to the application of the host system.

The invention further provides a device for testing a software component implemented in a host system on the basis of one or more test campaigns, a test campaign comprising computer test cases and being associated with input test data. The device is characterized in that it comprises:

a processing unit configured for:

executing the computer test cases of each test campaign for an operating time of said software component, which provides output test data associated with each test campaign; and         determining a reference operating model and a data partition on the basis of the input and output test data associated with each test campaign, a reference operating model being determined by applying a machine learning algorithm to said input and output test data, a data partition being determined by applying a data partitioning algorithm to said input and output test data;

a test unit configured for:

running said software component using input production run data, which provides output production run data;

determining an operating characteristic of the software component on the basis of the reference operating models according to a comparison between the input and output production run data and the data from the data partitions associated with the one or more test campaigns.

Advantageously, the embodiments of the invention allow the operation of a software component to be tested automatically.

Advantageously, the embodiments of the invention make it possible to detect whether the tested software component is outside of the qualified domain of use and to detect potential anomalies.

Advantageously, the embodiments of the invention provide automatic tests for software components based on artificial intelligence and data analysis techniques for black box testing.

DETAILED DESCRIPTION

The embodiments of the invention provide a method and a device for testing, automatically, a software component implemented in a host system on the basis of one or more test campaigns.

The method and the device according to the invention may be used to validate any type of component, equipment, product, computer system, information system, and software application implementing a software component to be tested, the software component being able to be a commercial off-the-shelf software item or a free software item.

Figure 1:
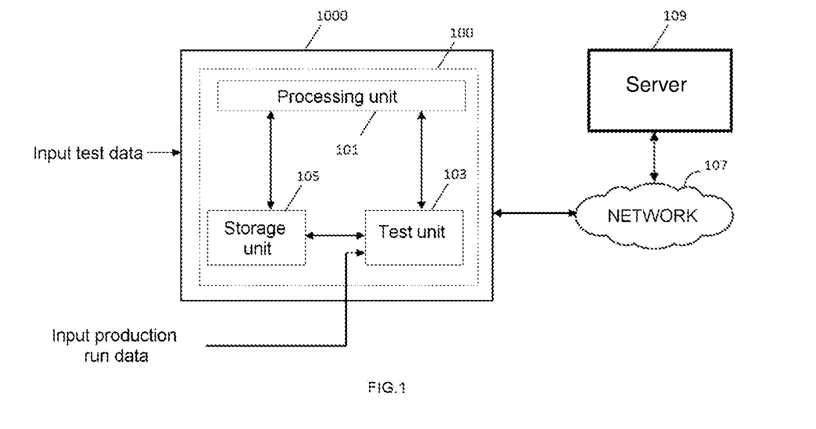
FIG. 1 shows a schematic view of a host system implementing a software component test device according to some embodiments of the invention.

With reference to FIG. 1, an example of a host system 1000 environment implementing a software component to be tested is illustrated, according to some embodiments of the invention.

The host system 1000 represents any type of information system dedicated to collecting, storing, structuring, modelling, managing, analysing, processing, and distributing data (text, images, sound, video).

According to some embodiments, the host system 1000 may comprise computer resources such as data files, databases and database management systems, enterprise resource planning software packages, customer management tools, supply chain management tools, collaboration tools, business applications, application or presentation (web) servers, integration architecture and network infrastructure.

According to some embodiments, the host system 1000 may be a personal computer device, a tablet computer, a customer terminal, a mobile telephone or any other computer device of this type implementing a software component. The host system 1000 may be used in various on-board industrial devices or systems such as satellites and medical devices.

With reference to FIG. 1, the host system 1000 may exchange, communicate or broadcast data to a system 109 via a communication network 107.

In some embodiments, the system 109 may be another information system exchanging data with the host system 1000 through one or more application programming interfaces.

In some embodiments using a client/server architecture, the host system 1000 may represent a client computer device exchanging data with a server computer system 109 providing data, via the communication network 107.

In some embodiments, the system 109 may be a server providing cloud computing services to at least one host system 1000. According to these embodiments, the computer services may be of the software as a service, platform as a service or infrastructure as a service type.

According to computer services of the software as a service type, the software used by the host system 1000 may be installed on the server 109. This software may comprise, by way of example, customer relationship management applications, videoconferencing applications, messaging and collaborative software applications, and e-commerce site creation applications.

According to computer services of the platform as a service type, the host system 1000 may be configured to maintain the applications and the server 109 may be configured to maintain the platform for executing these applications. The platform for executing client applications may comprise, without limitation, storage servers or hardware (for example the motherboard and its random-access memory), the system software comprising the one or more operating systems and database engines, and the infrastructure for connection to the network, for storage and for backup.

According to computer services of the infrastructure as a service type, the host system 1000 may be configured to manage the application software (for example the executable files, the settings and the databases) and the server 109 may be configured to manage the server hardware, the virtualization or containerization layers, the storage and the networks.

According to some embodiments, the communication network 107 may include one or more private and/or public networks which allow the host system 1000 to exchange data with the system 109, such as the Internet, a local area network (LAN), a wide area network (WAN), a cellular data/voice network, one or more high-speed bus connections and/or other types of communication networks (wired, wireless, radio).

The embodiments of the invention provide a device and a method for testing a commercial off-the-shelf or free software component implemented in the host system 1000 on the basis of one or more test campaigns.

According to some embodiments, the tested software component may be, by way of non-limiting example, a software component chosen from a group comprising extension components (for example plug-ins, codecs, drivers, etc.), libraries, executable files, files, data components (for example databases and ontologies), and configuration elements such as settings, scripts, and command files.

A test campaign comprises a set of computer test cases to be executed in a given period of time to meet a specific need. A computer test case is a test which is used to verify whether certain test data input for a given execution return the expected result. The need may be to verify that the behaviour of the tested software component is still the same after software updates, to verify the behaviour of a new functionality to be implemented, to ensure that the addition of new functionalities has not introduced any regression into old ones, or to ensure that changing server or database has not affected the service.

According to some embodiments, the period of time given to executing the test cases of a test campaign may be a few minutes or tens of minutes, a few days, or sometimes several weeks.

According to some embodiments, a test campaign may be a validation test campaign aiming to verify that the software component does indeed behave as expected, or a regression campaign aiming to verify that the implementation of new functionalities has not affected the behaviour of functionalities already present in the component, or else a vital test campaign aiming to ensure that the integration of the software component into the host system 1000 has not caused a critical regression in the application.

With reference to FIG. 1, a device 100 for testing a software component implemented in the host system 1000 on the basis of one or more test campaigns is illustrated. Each test campaign denoted by $C_i$ is associated with a set of input test data denoted by $E^i_1, E^i_2, \ldots, E^i_N$, the set of input test data comprising N input test values and the index i varying from 1 to the total number $N_{tot}$ of test campaigns considered, at least equal to 1. The testing of the software component is based on determining one or more reference operating models of the software component in a learning phase followed by a production run phase in which the operation of the software component in operational mode is compared with the different reference operating models, which makes it possible to determine an operating characteristic of the software component and to detect any anomalies and new functionalities of the software component.

According to some embodiments, the device 100 may comprise a processing unit 101 configured to execute the computer test cases of each test campaign $C_i$ for an operating time of the software component. The operating time may correspond to all of the given time periods needed to execute the test cases of each of the test campaigns considered. The execution of the computer test cases of each test campaign $C_i$ provides output test data denoted by $S^i_1, S^i_2, \ldots, S^i_N$ associated with each test campaign $C_i$.

The processing unit 101 may be configured to analyse and process the input test data $E^i_1, E^i_2, \ldots, E^i_N$ and the associated output test data $S^i_1, S^i_2, \ldots, S^i_N$ in each test campaign $C_i$ with i varying from 1 to $N_{tot}$ in order to determine a reference operating model of the software component and a data partition, on the basis of the input test data and the output test data associated with each test campaign.

More specifically, the processing unit 101 may be configured to determine a reference operating model denoted by $RTEM^i$ in association with each test campaign $C_i$ by applying a machine learning algorithm to the input test data $E^i_1, E^i_2, \ldots, E^i_N$ and output test data $S^i_1, S^i_2, \ldots, S^i_N$ associated with the test campaign $C_i$. The input test data $E^i_1, E^i_2, \ldots, E^i_N$ and the output test data $S^i_1, S^i_2, \ldots, S^i_N$ are given in pairs to the machine learning algorithm which will converge towards a state in which its internal parameters allow these pairs to be reproduced and generalized, while taking the necessary precautions to avoid underfitting and overfitting.

According to some embodiments, the machine learning algorithm may be a machine learning algorithm chosen from a group comprising unsupervised clustering machine learning algorithms.

In one preferred embodiment, the machine learning algorithm may be a deep neural network.

The processing unit 101 may be configured to determine a data partition denoted by $P^i$ in association with each test campaign $C_i$ by applying a data partitioning algorithm (also known as a data clustering algorithm) to the input test data $E^i_1, E^i_2, \ldots, E^i_N$ and output test data $S^i_1, S^i_2, \ldots, S^i_N$ associated with the test campaign $C_i$. The input test data $E^i_1, E^i_2, \ldots, E^i_N$ and the output test data $S^i_1, S^i_2, \ldots, S^i_N$ associated with each test campaign $C_i$, with i varying from 1 to $N_{tot}$, may thus be represented by operating points in a multidimensional space and may be separated or grouped into different partitions (as known as clusters).

According to some embodiments, the data partitioning algorithm may be chosen from a group comprising, without limitation, the k-means algorithm, hierarchical clustering algorithms and expectation-maximization algorithms.

In some embodiments, the device 100 may comprise a storage unit configured to save the reference operating models $RTEM^i$ and the data partitions $P^i$ determined by the processing unit 101 in the learning phase. Each data partition $P^i$ and each reference operating model $RTEM^i$ determined for each test campaign $C_i$ correspond to a given functionality of the tested software component. The set of data partitions $P^i$ associated with the test campaigns $C_i$ correspond to a domain of use D of said software component, also called a domain of qualification. The domain of use D represents the normal area of operation of the software component.

In some embodiments, the domain of use D may comprise at least one failure region.

In some embodiments, the total number of test campaigns may be chosen so as to produce as many reference operating models as necessary to cover all of the applications of the tested software component. The reference operating models constitute the desired reference behaviour.

In some embodiments, the device 100 may comprise a test unit 103 configured to determine an operating characteristic of the tested software component in a production run phase, also called operational phase.

More specifically, the test unit 103 may be configured to run or production run the tested software component using input production run data, which provides output production run data. The input production run data and the output production run data may be represented by an operating point of the software component.

Once the input production run data and the output production run data have been collected, the test unit 103 may be configured to determine an operating characteristic of the software component on the basis of the reference operating models $RTEM^i$, with i varying from 1 to $N_{tot}$, according to a comparison between the input and output production run data and the data from the data partitions $P^i$ associated with the test campaigns $C_i$. Comparing the operation of the software component in the system in production with the reference operating models based on learning makes it possible, in production, to characterize the operation of the software component and to detect any new or abnormal operation.

According to some embodiments, the test unit 103 may be configured to determine an operating characteristic of the software component by determining whether the operating point representing the input production run data and the output production run data belong to the domain of use D and to a data partition $P^j$ with j being able to vary between 1 and $N_{tot}$.

More specifically, the test unit 103 may be configured to determine whether the operating characteristic of the software component is an operating anomaly of the software component, whether the operating point representing the input production run data and the output production run data is within at least one failure region within the domain of use D or whether the operating point does not belong to the domain of use of the software component. Detecting an operating anomaly makes it possible to initiate a maintenance or repair procedure.

In some embodiments, the test unit 103 may be configured to determine whether the operating characteristic of the software component is a new functionality of the software component, whether the operating point representing the input production run data and the output production run data belongs to the domain of use and does not belong to any of the data partitions $P^i$ with i ranging from 1 to $N_{tot}$, and does not belong to any failure region of the domain of use D. The new functionality, which has not been taken on in the learning phase, forms part of the normal operation of the tested software component. It is possible, when detecting new functionalities, to trigger a new learning phase aiming to enrich the reference operating models of the software component. Fast, "active learning" methods may be implemented for this update.

In some embodiments, the test unit 103 may be configured to determine whether the operating characteristic of the software component is a given (known) functionality of the software component if the operating point representing the input production run data and the output production run data belongs to the data partition associated with the given functionality.

Figure 2:
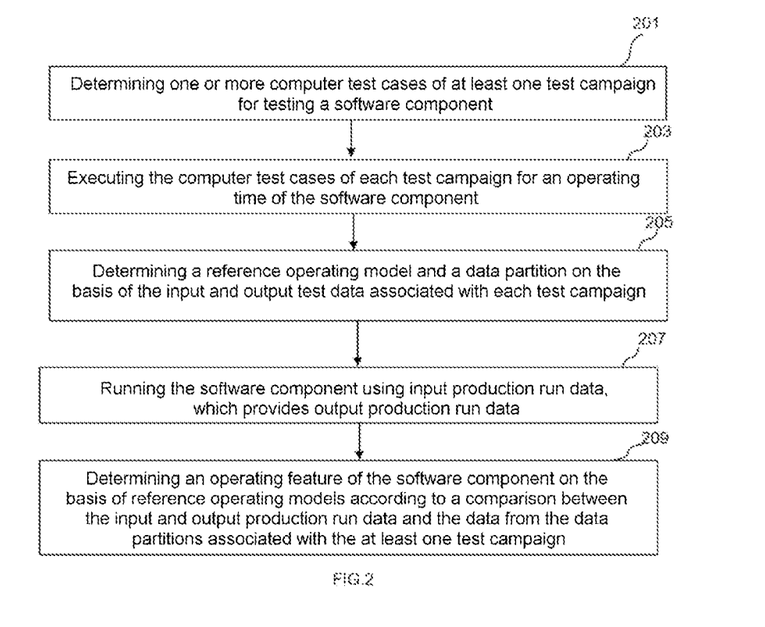
FIG. 2 shows a flowchart illustrating a method for testing a software component implemented in a host system according to some embodiments of the invention.

With reference to FIG. 2, a method for testing a software component is illustrated, according to some embodiments of the invention.

In some embodiments, the tested software component may be a commercial off-the-shelf software item or a free software item, implemented in a host system 1000. A commercial off-the-shelf software item may be, by way of non-limiting example, a commercial off-the-shelf software item chosen from a group comprising extension components (for example plug-ins, codecs, drivers, etc.), libraries, executable files, files, data components (for example databases and ontologies), and configuration elements (such as settings, scripts, and command files).

In some embodiments, the software component may be tested in order to verify that the behaviour of the software component is still the same after software updates, to verify the behaviour of a new functionality to be implemented, to ensure that the addition of new functionalities has not introduced any regression into old ones, or to ensure that changing server or database has not affected the service.

The method may comprise two phases: a learning phase which comprises steps 201 to 205, and a production run phase which comprises steps 207 and 209.

The learning phase corresponds to a phase of determining one or more reference operating models of the tested software component, during an offline operating time, on the basis of one or more test campaigns. A test campaign comprises a set of computer test cases to be executed in a given period of time to meet a particular requirement. A test campaign may be a validation test campaign aiming to verify that the software component does indeed behave as expected, or a regression campaign aiming to verify that the implementation of new functionalities has not affected the behaviour of functionalities already present in the component, or else a vital test campaign aiming to ensure that the integration of the software component into the host system 1000 has not caused a critical regression in the application.

A computer test case is a test which is used to verify whether certain test data input for a given execution return the expect result.

The production run phase corresponds to a phase of characterizing the operation of the tested component over an operational or functional period by comparing the online operation of the software component with the reference operating models determined in the learning phase. Characterizing the operation of the tested software component makes it possible to detect any anomalies and new functionalities of the software component.

In step 201, one or more computer test cases may be determined for at least one test campaign $C_i$ in order to test a software component. Each test campaign $C_i$ is associated with a set of input test data denoted by $E^i_1, E^i_2, \ldots, E^i_N$, the set of input test data comprising N input test values and the index i varying from 1 to the total number $N_{tot}$ of test campaigns considered, at least equal to 1.

According to some embodiments, the computer test cases may be determined or defined according to the application of the host system implementing the tested software component.

In step 203, the computer test cases of each test campaign $C_i$ may be executed for an operating time of the software component. The operating time may correspond to all of the given time periods needed to execute the test cases of each of the test campaigns considered. The execution of the computer test cases of each test campaign $C_i$ provides output test data denoted by $S^i_1, S^i_2, \ldots, S^i_N$ associated with each test campaign $C_i$.

In step 205, a reference operating model $RTEM^i$ of the software component and a data partition $P^i$ may be determined on the basis of the input test data $E^i_1, E^i_2, \ldots, E^i_N$ and the output test data $S^i_1, S^i_2, \ldots, S^i_N$ associated with each test campaign $C_i$, with i varying from 1 to $N_{tot}$.

More specifically, a reference operating model $RTEM^i$ of the software component may be determined, in association with each test campaign $C_i$, by applying a machine learning algorithm to the input test data $E^i_1, E^i_2, \ldots, E^i_N$ and to the output test data $S^i_1, S^i_2, \ldots, S^i_N$ associated with the test campaign $C_i$. The input test data $E^i_1, E^i_2, \ldots, E^i_N$ and the output test data $S^i_1, S^i_2, \ldots, S^iN$ are given in pairs to the machine learning algorithm which will converge towards a state in which its internal parameters allow these pairs to be reproduced and generalized, while taking the necessary precautions to avoid underfitting and overfitting.

According to some embodiments, the machine learning algorithm may be a machine learning algorithm chosen from a group comprising unsupervised clustering machine learning algorithms.

In one preferred embodiment, the machine learning algorithm may be a deep neural network.

In some embodiments, the input test data $E^i_1, E^i_2, \ldots, E^i_N$ and the output test data $S^i_1, S^i_2, \ldots, S^i_N$ associated with each test campaign $C_i$, with i varying from 1 to $N_{tot}$, may be represented by operating points in a multidimensional space and may be separated or grouped into different partitions (as known as clusters). A data partition $P^i$ may be determined in association with each test campaign $C_i$ by applying a data partitioning algorithm (also known as a data clustering algorithm) on the basis of the input test data $E^i_1, E^i_2, \ldots, E^i_N$ and the output test data $S^i_1, S^i_2, \ldots, S^i_N$ associated with each test campaign $C_i$. Each data partition $P^i$ and each reference operating model $RTEM^i$ determined for each test campaign $C_i$ correspond to a given functionality of the software component. The set of data partitions $P^i$ associated with the test campaigns $C_i$ correspond to a domain of use D of the software component, also called a domain of qualification. The domain of use D represents the normal area of operation of the software component.

In some embodiments, the domain of use D may comprise at least one failure region.

According to some embodiments, the data partitioning algorithm may be chosen from a group comprising, without limitation, the k-means algorithm, hierarchical clustering algorithms and expectation-maximization algorithms.

According to some embodiments, the total number of test campaigns may be chosen so as to produce as many reference operating models as necessary to cover all of the applications of the tested software component. The reference operating models constitute the desired reference behaviour.

In step 207, the software component may be put through a production run using input production run data, which provides output production run data. Putting the software component through a production run consists in running the software component while providing it with input production run data as input. The input production run data and the output production run data may be represented by an operating point of the software component.

In step 209, an operating characteristic of the software component may be determined on the basis of the reference operating models $RTEM^i$, with i varying from 1 to $N_{tot}$, according to a comparison between the input and output production run data and the data from the data partitions $P^i$ associated with the test campaigns $C_i$. Comparing the operation of the software component in the system in production with the reference operating models based on learning makes it possible, in production, to characterize the operation of the software component and to detect any new or abnormal operation.

According to some embodiments, an operating characteristic of the software component may be determined by determining whether the operating point representing the input production run data and the output production run data belongs to the domain of use D and to a data partition $P^j$ with j being able to vary between 1 and $N_{tot}$.

Figure 3:
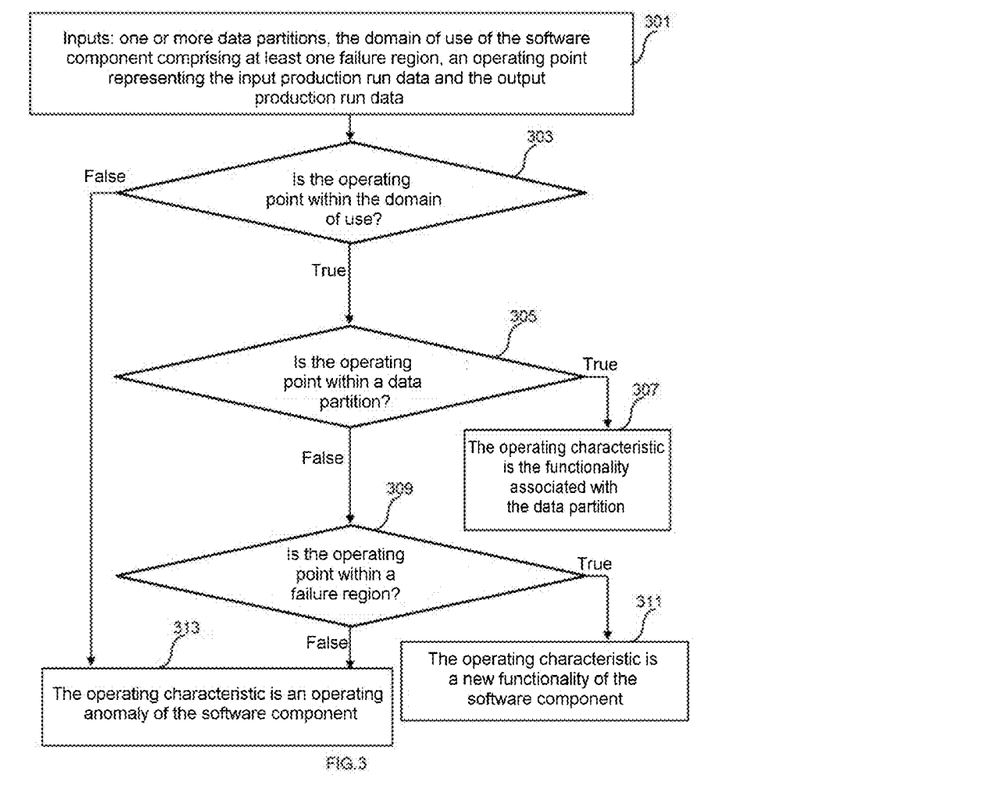
FIG. 3 shows a flowchart illustrating a step of determining an operating characteristic of a software component according to some embodiments of the invention.

With reference to FIG. 3, a flowchart illustrating the step of determining a characteristic of the software component in step 209 is presented, according to some embodiments.

In step 301, the data partitions $P^i$, the domain of use D comprising at least one failure region, and the operating point representing the input and output production run data may be received In step 303, it may be determined whether the operating point is within the domain of use D.

If it is determined in step 303 that the operating point does not belong to the domain of use D, an operating anomaly of the software component may be determined as the operating characteristic in step 313.

If it is determined in step 303 that the operating point does belong to the domain of use D, it may be determined in step 305 whether the operating point is within a data partition.

If it is determined in step 305 that the operating point is within a data partition $P^j$ with j varying between 1 and $N_{tot}$, the given (known) functionality associated with the partition $P^j$ to which the operating point belongs is determined as the operating characteristic in step 307.

If it is determined in step 305 that the operating point does not belong to any data partition $P^j$ with i ranging from 1 to $N_{tot}$, then step 309 may be executed to determine whether the operating point is within a failure region of the domain of use. If it is determined in step 309 that the operating point is within a failure region, then an operating anomaly of the software component may be determined as the operating characteristic in step 313. If it is determined in step 309 that the operating point does not belong to any failure region, a new functionality of the software component may be determined as the operating characteristic in step 311.

Figure 4:
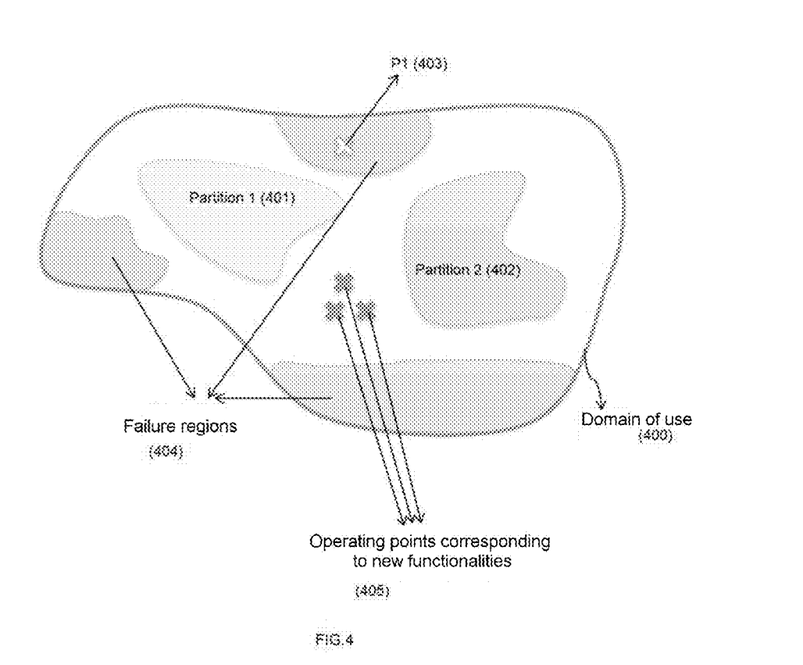
FIG. 4 shows operating points of a software component in a domain of use according to some embodiments of the invention.

With reference to FIG. 4, an example representation of operating points in a domain of use 400 is illustrated, according to some embodiments of the invention. The domain of use defines the area in which the software component operates.

As illustrated in FIG. 4, the domain of use 400 comprises three failure regions 404, a first partition 401 (also called Partition 1), and a second partition 402 (also called Partition 2). The operating point P1 403 belongs to a failure region and correspond to the detection of an operating anomaly. The operating points 405 are within the domain of use D but outside of the first and second partitions 401 and 402. These operating points correspond to the detection of a new functionality of the software component which was not considered in the learning phase.

The invention further provides a computer program product comprising code instructions making it possible to perform the steps of the method when said program is executed on a computer.

Figure 5:
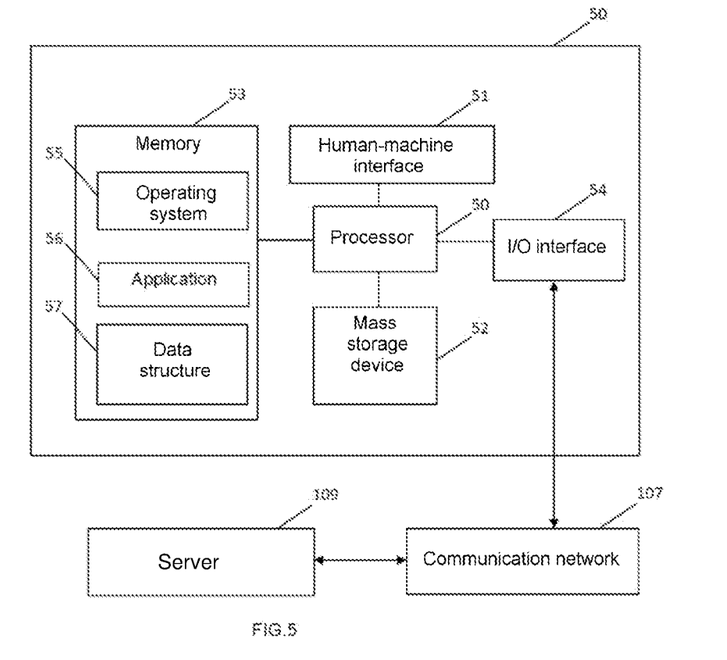
FIG. 5 shows a schematic view of an example of a host system for the implementation of a software component test device according to some embodiments of the invention.

The device 100, the method and the software component test computer program product according to the various embodiments of the invention may be implemented on one or more computer systems or devices, referred to generically as computers, such as the computer 50 illustrated in FIG. 5. The computer 50 may include a processor 50, a memory 53, a database 52 forming part of a mass storage memory device, an input/output (I/O) interface 54 and a human-machine interface (HMI) 51. The computer 50 may communicate with the system 109 via a communication network 107 and with the communication network 107 via the input/output (I/O) interface 54. The external resources may include, but without being limited to, servers, databases, mass storage devices, peripheral devices, cloud services or any other suitable computer resource which may be used with the computer 50.

The processor 50 may include one or more devices selected from: microprocessors, microcontrollers, digital signal processors, microcomputers, central processing units, programmable gate arrays, programmable logic devices, finite-state machines, logic circuits, analogue circuits, digital circuits or any other device used to handle (analogue or digital) signals based on operating instructions stored in the memory 53. The memory 53 may include a single memory device or a plurality of memory devices, in particular, but without being limited to, read-only memory (ROM), random-access memory (RAM), volatile memory, non-volatile memory, static random-access memory (SRAM), dynamic random-access memory (DRAM), flash memory, cache memory or any other device capable of storing information. The mass storage device 52 may include data storage devices such as a hard drive, an optical disc, a magnetic tape drive, a volatile or non-volatile solid-state circuit or any other device capable of storing information. A database may reside on the mass storage memory device 52, and may be used to collect and organize the data used by the various systems and modules described here.

The processor 50 may operate under the control of an operating system 55 which resides in the memory 53. The operating system 55 may manage the computer resources such that the program code of the computer, integrated in the form of one or more software applications, such as the application 56 which resides in the memory 53, may have instructions executed by the processor 50. In another embodiment, the processor 50 may directly execute the application 56.

In general, the routines executed to implement the embodiments of the invention, whether they are implemented in the context of an operating system or a specific application, a component, a program, an object, a module or a sequence of instructions, or even a subset thereof, may be referred to here as "computer program code" or just "program code". The program code typically comprises instructions that are readable by computer which reside at various times in various memory and storage devices in a computer and which, when they are read and executed by one or more processors in a computer, cause the computer to perform the operations required to execute the operations and/or the elements specific to the various aspects of the embodiments of the invention. The instructions of a program, which are readable by computer, for performing the operations of the embodiments of the invention may be, for example, the assembly language, or else a source code or an object code written in combination with one or more programming languages.

The invention claimed is:

1. A method for testing a software component implemented in a host system on the basis of one or more test campaigns, a test campaign comprising computer test cases and being associated with input test data, the method being comprising the steps of:

executing the computer test cases of each test campaign for an operating time of said software component, which provides output test data associated with each test campaign;

determining a reference operating model and a data partition on the basis of the input and output test data associated with each test campaign, a reference operating model being determined by applying a machine learning algorithm to said input and output test data, the data partition being determined by applying a data partitioning algorithm to said input and output test data;

running said software component using input production run data, which provides output production run data; and determining an operating characteristic of said software component on the basis of the reference operating models according to a comparison between the input and output production run data and the data from the data partitions associated with said one or more test campaigns, wherein said software component is a free software item or a commercial off-the-shelf software item.

2. The method for testing a software component according to claim 1, wherein said machine learning algorithm is a machine learning algorithm chosen from a group comprising unsupervised clustering machine learning algorithms.

3. The method for testing a software component according to claim 2, wherein said machine learning algorithm is a deep neural network.

4. The method for testing a software component according to claim 1, wherein said data partitioning algorithm is chosen from a group comprising the k-means algorithm, hierarchical clustering algorithms and expectation-maximization algorithms.

5. The method for testing a software component according to claim 1, wherein the set of data partitions associated with said one or more test campaigns corresponds to a domain of use of said software component, the input production run data and the output production run data being represented by an operating point of said software component, said step of determining an operating characteristic of said software component comprising the operation of determining whether said operating point belongs to said domain of use and to a data partition.

6. The method for testing a software component according to claim 5, wherein said domain of use comprises at least one failure region, said operating characteristic being an operating anomaly of said software component if said operating point is within said at least one failure region or if said operating point does not belong to said domain of use.

7. The method for testing a software component according to claim 5, wherein said operating characteristic is a new functionality of the software component if said operating point belongs to said domain of use and does not belong to any of said one or more data partitions or to any of said at least one failure regions.

8. The method for testing a software component according to claim 5, wherein each data partition and each operating model associated with each test campaign corresponds to a given functionality of said software component, said operating characteristic being said given functionality if said operating point belongs to the data partition corresponding to said functionality.

9. The method for testing a software component according to claim 1, wherein said computer test cases are defined according to an application of said host system.

10. A device for testing a software component implemented in a host system on the basis of one or more test campaigns, a test campaign comprising computer test cases and being associated with input test data, the device being comprising:

a processing unit configured for:
   executing the computer test cases of each test campaign for an operating time of said software component, which provides output test data associated with each test campaign, and
   determining a reference operating model and a data partition on the basis of the input and output test data associated with each test campaign, a reference operating model being determined by applying a machine learning algorithm to said input and output test data, the data partition being determined by applying a data partitioning algorithm to said input and output test data; and a test unit configured for:
   running said software component using input production run data, which provides output production run data, and
   determining an operating characteristic of said software component on the basis of the reference operating models according to a comparison between the input and output production run data and the data from the data partitions associated with said one or more test campaigns, wherein said software component is a free software item or a commercial off-the-shelf software item.

* * * * *